G. P. TAYLOR.
SPEEDOMETER.
APPLICATION FILED JUNE 27, 1910.
995,926.
Patented June 20, 1911.
2 SHEETS—SHEET 1.
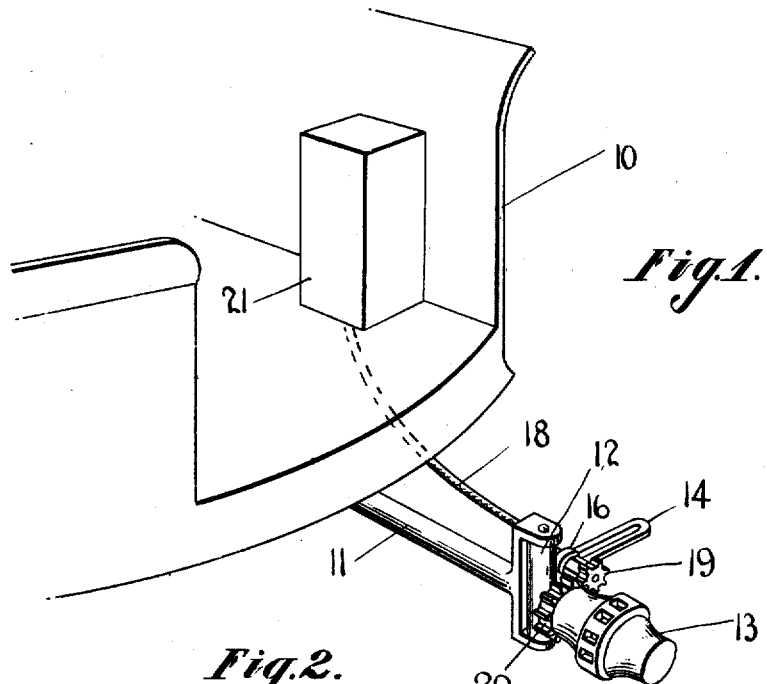
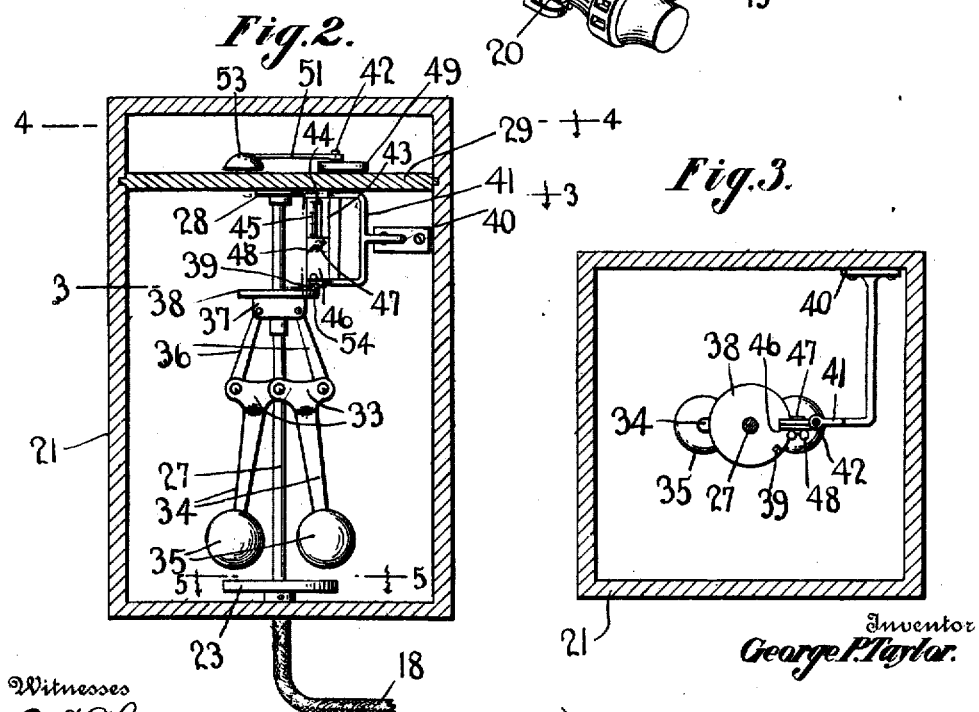
Witnesses
C. C. Chandlee
L. N. Gillis
Inventor
George P. Taylor
By Chandlee Chandlee
Attorneys G. P. TAYLOR.
SPEEDOMETER.
APPLICATION FILED JUNE 27, 1910.
995,926.
Patented June 20, 1911.
2 SHEETS—SHEET 2.
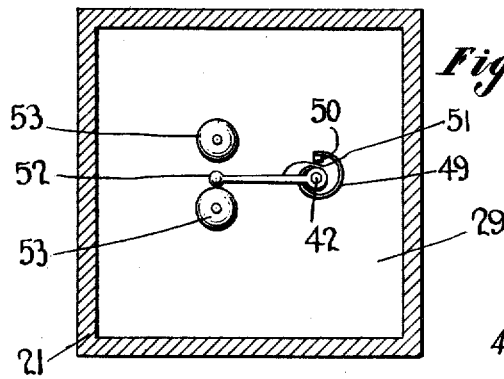
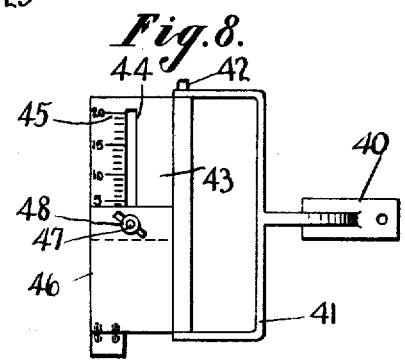
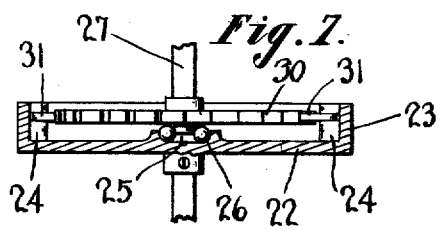
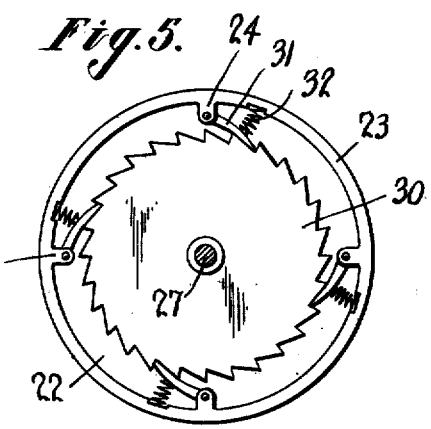
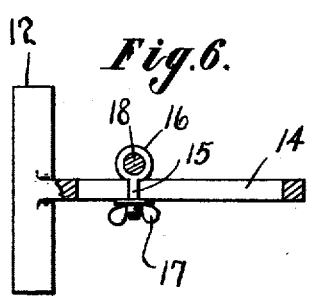
Witnesses
C. C. Chandler.
L. N. Gullis
Inventor
George P. Taylor.
By
Chandler Chandler
Attorneys

UNITED STATES PATENT OFFICE.

GEORGE P. TAYLOR, OF LUTHER, OKLAHOMA.

SPEEDOMETER.

995,926.  Specification of Letters Patent.  Patented June 20, 1911.

Application filed June 27, 1910. Serial No. 569,183.

*To all whom it may concern:*

Be it known that I, GEORGE P. TAYLOR, a citizen of the United States, residing at Luther, in the county of Oklahoma, State of Oklahoma, have invented certain new and useful Improvements in Speedometers; and I do hereby declare the following to be a full, clear, and exact description of the invention, such as will enable others skilled in the art to which it appertains to make and use the same.

This invention relates to speedometers and more especially refers to a type of device of this character which is adapted to sound a signal upon a predetermined speed being exceeded, the device being so arranged that it may be set for various speeds.

The invention still more specifically refers to a device of this character adapted for use on automobiles and the like self propelled vehicles.

One object of the invention is to provide a device of the class described which may be readily attached to any automobile and which will, when so attached, sound an alarm whenever the vehicle is run beyond a predetermined speed.

A second object of the invention is to provide a device of this character wherein the speed at which the alarm is sounded may be varied by a simple and novel construction.

With the above and other objects in view, the invention consists in general of a speedometer of novel construction adapted to sound an alarm whenever a predetermined speed is exceeded, the apparatus being adjustable for varying speeds.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a perspective view of a portion of a vehicle showing the invention applied thereto. Fig. 2 is a section through a casing containing the principal elements of the invention. Fig. 3 is a section on the line 3—3 of Fig. 2. Fig. 4 is a section on the line 4—4 of Fig. 2. Fig. 5 is an enlarged detail section on the line 5—5 of Fig. 2. Fig. 6 is a detail view of a portion of a knuckle adapted for use with this invention. Fig. 7 is a detail transverse section through Fig. 5. Fig. 8 is an enlarged detail view of the mechanism whereby the device is adjusted for varying speeds.

The invention is herein shown as applied to a motor vehicle, the body of which is indicated at 10 while at 11 is shown the front axle, at 12 the body of a steering knuckle and at 13 one of the wheel hubs, it being understood that most of the parts of the vehicle are omitted for the clearness in illustrating the application of the device.

Extending from the knuckle 12 is a slotted arm 14 wherethrough passes a stem 15 having on its upper end a collar 16 and on its lower end a thumb nut 17. Through this collar passes a flexible shaft 18 carrying on its end a pinion 19 which meshes with a gear 20 fixed upon the hub 13. By means of this slotted arm the sizes of the pinion and gear may be varied so that different diameters of wheels may be used in connection with the device.

Mounted in any suitable position on the body of the vehicle is a casing 21 and the flexible shaft 18 extends up through the bottom of this casing and has secured thereto a disk 22 having an upstanding peripheral flange 23 on the inner side of which are formed spaced bosses 24. Centrally of the disk 22 is a ball cup 25 wherein is held a series of balls 26 which support the lower end of a shaft 27, the upper end of this shaft being mounted in a bearing 28 secured to a horizontal partition 29 extending across the casing. On the lower end of the shaft 27 and fitting within the peripheral flange 23 is a ratchet wheel 30 and pivoted to the bosses 24 are pawls 31 normally held in engagement with the periphery of the ratchet wheel by springs 32. By this means when the shaft 18 is revolved in one direction the shaft 27 will be rotated but when said shaft 18 is rotated in the opposite direction the shaft 27 will remain still. It is intended that the rotation of the shaft 27 shall take place when the vehicle is moving forwardly and to this end the ratchet and pawls are arranged to act when the vehicle is thus moving and remain inactive when the vehicle is backed up.

Pivoted upon the shaft 27 are a pair of governor arms 33 each of which has a downwardly depending portion 34 carrying on its lower end the usual governor ball 35. These arms 33 are united on a common pivot and pivoted to the outer end of each of said arms is a link 36 the upper end of which is connected to a sliding collar 37 movable longitudinally of the shaft 27. On this sliding collar is a disk 38 projecting upwardly wherefrom is a lug 39 constituting a striker.

Secured to the back wall of the casing 21 is a bracket 40 which extends forwardly and laterally and terminates in a forked end 41, the arms of the fork constituting bearings wherein is supported a shaft 42. Fixed upon the shaft 42 between the arms of the fork 41 is a plate 43 provided with a slot 44 extending vertically of the plate and adjacent this slot the plate is graduated as at 45. Below the plate 43 is a second plate 46 having an opening through which passes a bolt 47 carrying a thumb nut 48. The bolt 47, furthermore, passes through the slot 44 and by this means the plate 46 may be adjusted vertically with reference to the plate 43, the upper edge of said plate 46 acting as an index on the scale 45.

The shaft 42 extends upwardly through the partition 29 and on the upper end of this shaft is a spiral spring 49 having its ends secured respectively to the shaft and to a pin 50 projecting upwardly from the partition 29. This spring is so arranged that the plates 43 and 46 are normally held in the path of the striker 39 but by reason of this spring the plates will yield when struck by the striker and fly back with an oscillatory motion similar to that given the balance wheel of a watch by the hair spring. On the upper end of the shaft 42 is a clapper arm 51 carrying on its end a ball 52. At 53 are spaced bells which are supported on the partition 29 and the ball 52 is arranged to oscillate between the bells when the plate 46 is struck by the striker and the shaft set in motion.

In the operation of the device the proper gears 20 and 19 are placed upon the hub 13 and shaft 18 so that as the hub 13 revolves the shaft 18 will revolve at such speed that the plate 46 will, when properly adjusted, be struck by the striker 39 when the automobile is running at the speed indicated on the scale 45 by the top edge of said plate 46. For instance, if it be desired to ring the alarm when the automobile is going at 12 miles an hour the thumb screw 48 is loosened and the upper edge of the plate 46 set at the 12 mark on the index 45. Now when the automobile has reached the speed of 12 miles an hour, the proper gears 19 and 20 being used, the centrifugal action on the governor will cause the balls 35 to fly out to such distance that the collar 37 will be raised by the links 36 until the striker 39 contacts with the lower edge of said plate 46. As this takes place every time the shaft 27 revolves the striker will repeat this contact with the result that the arm 51 will be kept in constant oscillation so that the bells 53 will be rung and will continue ringing until the speed of the machine decreases sufficiently for the striker to pass beneath the lower edge of said plate 46. It is to be understood that the striker is made of such length that any slight excess of speed over that to which the machine is set will not destroy its effectiveness by jamming the plate or disk 38 against the lower edge of the plate 46.

For the purpose of providing for privately notifying the person running the automobile that he is approaching the speed limit to which the device is set there is provided a plate 54 which is hinged to the bottom of the plate 46 so that it will move freely in one direction with reference to this plate 46. This plate 54 lies in the path of the striker 39 and as this striker revolves the plate 54 will be struck thereby when the speed limit is approached thus setting up a series of taps which can be heard by the person running the machine but which are not audible to persons not in the machine. The plate 54 does not, however, interfere with the regular operation of the machine as when the speed limit has been reached the plate will be bent back so that the plate 46 may be engaged by the striker.

There has thus been provided a simple and efficient device of the kind described and for the purpose specified.

Having thus described the invention, what is claimed as new, is:—

1. In a speedometer, a rotary shaft, a governor mechanism on said shaft, a striker operatively connected to the governor mechanism, means to connect the striker operatively to the governor mechanism, a rock shaft, a member projecting from said shaft and adapted to be engaged by the striker, a clapper extending from said rock shaft, a bell adapted to be struck by said clapper, resilient means normally holding said member in position to be engaged by said striker, and means for adjustably holding the member in position relative to the rock shaft.

2. In a speedometer, a rotary shaft, a governor mechanism on said shaft, a striker operatively connected to the governor mechanism, means to connect the striker operatively to the governor mechanism, a rock shaft, a plate projecting from the rock shaft, a second plate depending from the first mentioned plate and movable vertically with reference to said first mentioned plate, means to hold said plates in adjusted relation, said second plate being adapted to be engaged by said striker when the striker is moved by the action of said governor, an arm on said rock shaft, and an alarm adapted to be actuated by the movement of said arm.

3. In a speedometer, a rotary shaft, a governor mechanism on said shaft, a striker operatively connected to the governor mechanism, means to connect the striker operatively to the governor mechanism, a rock shaft, a plate projecting from the rock shaft, a second plate depending from the first mentioned plate and movable vertically with reference to said first mentioned plate, means to hold said plates in adjusted relation, said second plate being adapted to be engaged by said striker when the striker is moved by the action of said governor, an arm on said rock shaft, an alarm adapted to be actuated by the movement of said arm, and resilient means normally holding said second plate in position to be engaged by said striker.

4. In a speedometer, a rotary shaft, a governor mechanism on said shaft, a striker slidably mounted on said shaft, an operative connection between said governor mechanism and striker to move the striker along said shaft as the governor operates, a rock shaft, a member projecting from said rock shaft and adapted to be engaged by said striker, a clapper extending from said rock shaft, a bell adapted to be engaged by said clapper, resilient means normally holding said member in position to be engaged by said striker, and means for adjustably holding the member in position relative to the rock shaft.

5. In a speedometer, a casing, a rotary shaft, a governor mechanism on said shaft, a collar slidably mounted on said shaft, an operative connection between said governor mechanism and collar to move the collar along the shaft as the governor operates, a disk carried by said collar, a lug projecting upwardly from said disk, a rock shaft journaled adjacent the disk, a plate fixed to said rock shaft and projecting over said disk, a second plate depending from the first mentioned plate and projecting over said disk to have its lower edge in the path of the lug as the disk is raised by the governor, means to adjustably connect said first and second plates, a balance spring having one end connected to said rock shaft and the other to the casing, a clapper extending from said rock shaft, and a pair of bells lying on opposite sides of said clapper and engaged thereby when the rock shaft is oscillated.

6. In a speedometer, a rotary shaft, a governor mechanism on said shaft, a striker operatively connected to the governor mechanism, means to connect the striker operatively to the governor mechanism, a rock shaft, a member projecting from said rock shaft and adapted to be engaged by the striker, a clapper extending from said rock shaft, a bell adapted to be struck by said clapper, resilient means normally holding said member in position to be engaged by said striker, and means for adjustably holding the member in position relative to the rock shaft; in combination with a driving shaft adapted to be operatively connected to a vehicle wheel, and a pawl and ratchet mechanism connecting the first mentioned shaft and driving shaft and arranged to rotate the first mentioned shaft during forward movement of the vehicle only.

7. In a speedometer, a rotary shaft, a governor mechanism on said shaft, a striker operatively connected to the governor mechanism, means to connect the striker operatively to the governor mechanism, a rock shaft, a plate projecting from the rock shaft, a second plate depending from the first mentioned plate and movable vertically with reference to said first mentioned plate, means to hold said plates in adjusted relation, said second plate being adapted to be engaged by said striker when the striker is moved by the action of said governor, an arm on said rock shaft, and an alarm actuated by the movement of said arm; in combination with a driving shaft adapted to be operatively connected to a vehicle wheel, and a pawl and ratchet mechanism connecting the first mentioned shaft and driving shaft and arranged to rotate the first mentioned shaft during forward movement of the vehicle only.

8. In a speedometer, a rotary shaft, a governor mechanism on said shaft, a striker operatively connected to the governor mechanism, means to connect the striker operatively to the governor mechanism, a rock shaft, a plate projecting from the rock shaft, a second plate depending from the first mentioned plate and movable vertically with reference to said first mentioned plate, means to hold said plates in adjusted relation, said second plate being adapted to be engaged by said striker when the striker is moved by the action of said governor, an arm on said rock shaft, an alarm actuated by the movement of said arm, and resilient means normally holding said second plate in position to be engaged by said striker, in combination with a driving shaft adapted to be operatively connected to a vehicle wheel, and a pawl and ratchet mechanism connecting the first mentioned shaft and the driving shaft and arranged to rotate the first mentioned shaft during forward movement of the vehicle only.

9. In a speedometer, a rotary shaft, a governor mechanism on said shaft, a striker slidably mounted on said shaft, an operative connection between said governor mechanism and striker to move the striker along said shaft as the governor operates, a rock shaft, a member projecting from said rock shaft and adapted to be engaged by said striker, a clapper extending from said rock shaft, a bell adapted to be engaged by said clapper, resilient means normally holding said member in position to be engaged by said striker, and means for adjustably holding the member in position relative to the rock shaft; in combination with a driving shaft adapted to be operatively connected to a vehicle wheel, and a pawl and ratchet mechanism connecting the first mentioned shaft and driving shaft and arranged to rotate the first mentioned shaft during forward movement of the vehicle only.

10. In a speedometer, a casing, a rotary shaft, a governor mechanism on said shaft, a collar slidably mounted on said shaft, an operative connection between said governor mechanism and collar to move the collar along the shaft as the governor operates, a disk carried by said collar, a lug projecting upwardly from said disk, a rock shaft journaled adjacent the disk, a plate fixed to said rock shaft and projecting over said disk, a second plate depending from the first mentioned plate and projecting over said disk to have its lower edge in the path of the lug as the disk is raised by the governor, means to adjustably connect said first and second plates, a balance spring having one end connected to said rock shaft and the other to the casing, a clapper extending from said rock shaft, and a pair of bells lying on opposite sides of said clapper and engaged thereby when the rock shaft is oscillated; in combination with a driving shaft adapted to be operatively connected to a vehicle wheel, and a pawl and ratchet mechanism connecting the first mentioned shaft and driving shaft and arranged to rotate the first mentioned shaft during forward movement of the vehicle only.

11. In a speedometer, a rotary shaft, a governor mechanism on said shaft, a striker slidably mounted on said shaft, an operative connection between said governor mechanism and striker to move the striker along said shaft as the governor operates, a rock shaft, a member projecting from said rock shaft and adapted to be engaged by said striker, a clapper extending from said rock shaft, a bell adapted to be engaged by said clapper, resilient means normally holding said member in position to be engaged by said striker, and a plate hinged to the lower edge of the projecting member and adapted to be engaged by said striker when moved to pass just below said member.

In testimony whereof, I affix my signature, in presence of two witnesses.

GEORGE P. TAYLOR.

Witnesses:
P. M. VOREL,
WATSON DANA.

---

Copies of this patent may be obtained for five cents each, by addressing the "Commissioner of Patents, Washington, D. C."